(12) United States Patent
Quinn et al.

(10) Patent No.: US 7,650,962 B2
(45) Date of Patent: Jan. 26, 2010

(54) ROTARY ACTUATED SEISMIC SOURCE AND METHODS FOR CONTINUOUS DIRECT-PUSH DOWNHOLE SEISMIC TESTING

(75) Inventors: Mark K. Quinn, Duluth, GA (US); Alexander V. McGillivray, Atlanta, GA (US); Paul W. Mayne, Marietta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 504 days.

(21) Appl. No.: 11/223,594

(22) Filed: Sep. 9, 2005

(65) Prior Publication Data

US 2006/0118353 A1 Jun. 8, 2006

Related U.S. Application Data

(60) Provisional application No. 60/610,712, filed on Sep. 17, 2004.

(51) Int. Cl.
*G01V 1/147* (2006.01)
*G01V 1/153* (2006.01)
*G01V 1/155* (2006.01)

(52) U.S. Cl. ............................ 181/121; 367/189
(58) Field of Classification Search ............... 181/121; 367/189; 74/64, 83, 437, 457, 460, 650, 74/665 R, 721, 665 F
See application file for complete search history.

(56) References Cited

U.S. PATENT DOCUMENTS

| | | | | |
|---|---|---|---|---|
| 3,277,977 A | * | 10/1966 | Silverman | 367/140 |
| 3,426,608 A | * | 2/1969 | Loughran et al. | 74/393 |
| 3,557,603 A | * | 1/1971 | Carr | 73/12.04 |
| 3,716,111 A | * | 2/1973 | Lavergne | 181/113 |
| 4,020,625 A | * | 5/1977 | Mahon et al. | 368/100 |
| 4,050,540 A | * | 9/1977 | Cholet et al. | 181/114 |
| 4,118,994 A | * | 10/1978 | Layotte et al. | 74/61 |
| 4,291,780 A | * | 9/1981 | Fulkerson | 181/121 |
| 4,412,750 A | * | 11/1983 | Schuder et al. | 368/98 |
| 4,564,083 A | * | 1/1986 | Layotte et al. | 181/114 |
| 4,609,066 A | * | 9/1986 | Layotte et al. | 181/121 |
| 4,850,451 A | * | 7/1989 | Cholet et al. | 181/114 |
| 5,003,190 A | * | 3/1991 | Seiler | 307/9.1 |
| 5,400,640 A | * | 3/1995 | Stuckey | 73/12.14 |

(Continued)

*Primary Examiner*—Jeffrey Donels
*Assistant Examiner*—Jeremy Luks
(74) *Attorney, Agent, or Firm*—Troutman Sanders LLP; Ryan A. Schneider; James H. Yancey, Jr.

(57) ABSTRACT

Remotely operated rotary actuated shear wave generating apparatus and methods that generate horizontally polarized vertically propagating shear waves for use in down-hole shear wave velocity measurements. Seismic signals are generated by an offset mass rotating in a plane perpendicular to the surface of the ground, which impacts an impact member coupled to the ground. The energy of impact is transmitted to the ground parallel to the surface of the ground. The apparatus uses a spring-loaded rotating mass that has a rotary motion. Because acceleration of the mass is not horizontal, reaction forces caused by acceleration of the mass create less horizontal shear stress in the ground prior to the desired time (impact). Reaction forces of the accelerated rotating mass does not generate undesirable waves that obscure the desirable waves caused by impact with the impact member. The source generates transient shear waves repeatedly at constant intervals. Wave motions are recorded by a probe as it is advanced into the ground, without pause.

6 Claims, 9 Drawing Sheets

U.S. PATENT DOCUMENTS 5,483,026 A 1/1996 Hasbrouck et al.
6,001,075 A * 12/1999 Clemens et al. ............... 602/16
6,042,217 A * 3/2000 Jones .......................... 347/32

* cited by examiner

Fig. 7a $$V_s = \frac{\sqrt{z_2^2 + x^2} - \sqrt{z_1^2 + x^2}}{\Delta T}$$

- COUPLING A SEIZMIC SHEAR WAVE GENERATOR TO THE GROUND — 41
- INSERTING A SEIZMIC SENSOR A SHORT DISTANCE INTO THE GROUND — 42
- REPEATEDLY GENERATING (HORIZONTALLY POLARIZED) SEISMIC SHEAR WAVES USING THE SEIZMIC SHEAR WAVE GENERATOR — 43
- TRANSMITTING THE (HORIZONTALLY POLARIZED) SEISMIC SHEAR WAVES INTO THE GROUND — 44
- CONTINUOUSLY INSERTING THE SEIZMIC SENSOR INTO THE GROUND TO A GREATER AND GREATER DEPTH, UNTIL IT REACHES A PREDETERMINED DEPTH — 45
- DETECTING THE SEIZMIC SHEAR WAVES TRANSMITTED INTO THE GROUND USING THE SEIZMIC SENSOR WHILE IT IS BEING INSERTED INTO THE GROUND — 46
- PROCESSING THE DETECTED SEIZMIC SHEAR WAVES TO GENERATE SEIZMIC DATA INDICATIVE OF THE GEOLOGY OF THE GROUND — 47

ROTARY ACTUATED SEISMIC SOURCE AND METHODS FOR CONTINUOUS DIRECT-PUSH DOWNHOLE SEISMIC TESTING

This application claims the benefit of U.S. Provisional Application No. 60/610,712, filed Sep. 17, 2004.

BACKGROUND

The present invention relates generally to seismic shear wave generators, and more particularly, to a rotary actuated seismic shear wave generator and related testing methods.

Shear wave velocity is a valuable parameter for evaluating the behavior of subsoils, foundation systems, and earthen structures for both static and dynamic load conditions. The velocity characteristics of the upper 30 meters of soil, in particular, can have a great influence on the severity of earthquake ground motions, settlements, and stability of structures. Though there are several accepted methods for measuring shear wave velocity, direct-push downhole methods, such as the Seismic Cone Penetration Test, provide a fast, direct, and cost-effective means for determining shear wave velocity profiles of soil columns.

The downhole method requires a source for generating shear waves to be placed at the surface, and one or more receivers to be installed in the subsurface, beneath the source, at varying depths. Waves generated by the source at the surface, propagate into the subsurface where the motions can be detected and recorded with the aid of geophones, hydrophones, accelerometers, or some other transducers with means for detecting motion.

With the direct-push technique, the sensors are installed in a probe that is advanced into the soil without predrilling, typically at a constant rate actuated by hydraulic cylinders. The recorded signals at varying depths are analyzed to determine the travel times for the waves to propagate past one receiver and to the next. The difference in travel distances divided by the differences in travel times yields the velocity of the wave. By making measurements at several depths, a profile can be made of how velocities change with depth.

The most basic device for the purpose of generating horizontally polarized vertically propagating shear waves is a sledge hammer swung by an operator against a steel or wooden beam coupled to the ground surface by heavy weight. In order to eliminate the need for a hammer operator, devices have been developed that can be operated remotely by the person operating a receiver recording system. Existing remotely operated seismic source devices employ hydraulic, pneumatic, or electrical forces to accelerate a mass horizontally (parallel to the ground surface) into an object coupled to the ground, by heavy weight or other means. These devices are often very large, heavy, and expensive. Smaller, less expensive implementations of these devices depend significantly on the ground surface to provide the reaction force for accelerating the mass. The reaction forces to the acceleration of the mass are parallel to the ground surface and generate shear waves prior to the desired time at impact. The shear waves created by the acceleration reaction forces can obscure the shear waves created by the impact with the coupled object, making small inexpensive versions of the horizontal motion seismic sources inadequate.

For example, U.S. Pat. No. 5,486,026 discloses in its Abstract "An apparatus and a method for generating seismic waves utilizes a heavy flywheel positioned for rotation in a vertical plane to generate and store energy which is then transferred to the ground. The device includes two balanced hammers mounted on the flywheel as impact members. In operation, the flywheel is spun to a predetermined speed and then, on command, the hammers are extended outward from the flywheel so that one hammer strikes either a vertical or a horizontal strike member, thus providing a rapid transfer of a large amount of kinetic energy to the ground resulting in the generation of a set of seismic waves." It is stated in the Summary of the Invention section of U.S. Pat. No. 5,486,026 that "there is provided an apparatus for generating seismic waves comprising a striker platform and a rotator assembly mounted on the striker platform. The rotator assembly comprises a flywheel positioned for rotation in a vertical plane, an impact means mounted thereon, and a means for rotating the flywheel. The impact means contacts a horizontal-impact assembly or a vertical-impact assembly to create the seismic wave."

Conventional direct-push downhole procedures dictate that the progress of the penetrating sensor probe be halted during generation and recording of the shear waves. It would be desirable to have a rotary actuated seismic shear wave generator that improves upon conventional generators, such as those discussed above, in order to reduce time, effort, and cost associated with the testing procedure. If a source were able to repeatedly generate shear waves at a constant interval, the probe could continue to be advanced into the ground at a steady rate and record the detected motions without pause. Additionally, if the source were able to generate signals at a fast rate, overlapping and redundant measurements could be made to improve the reliability, accuracy, and resolution of the determined shear wave velocity profile.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
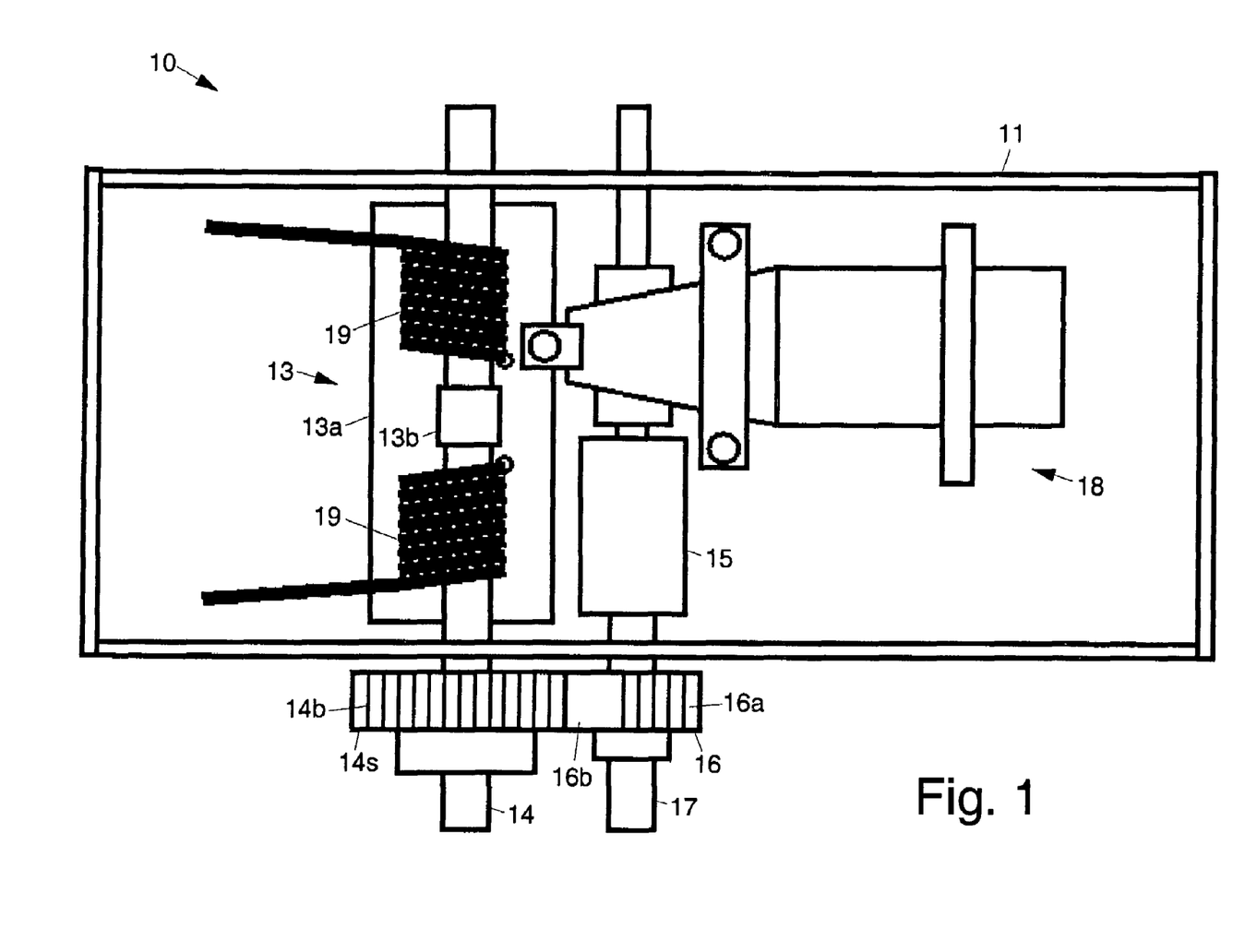
FIG. 1 is a top view of an exemplary embodiment of a rotary actuated seismic shear wave generator.
Figure 2:
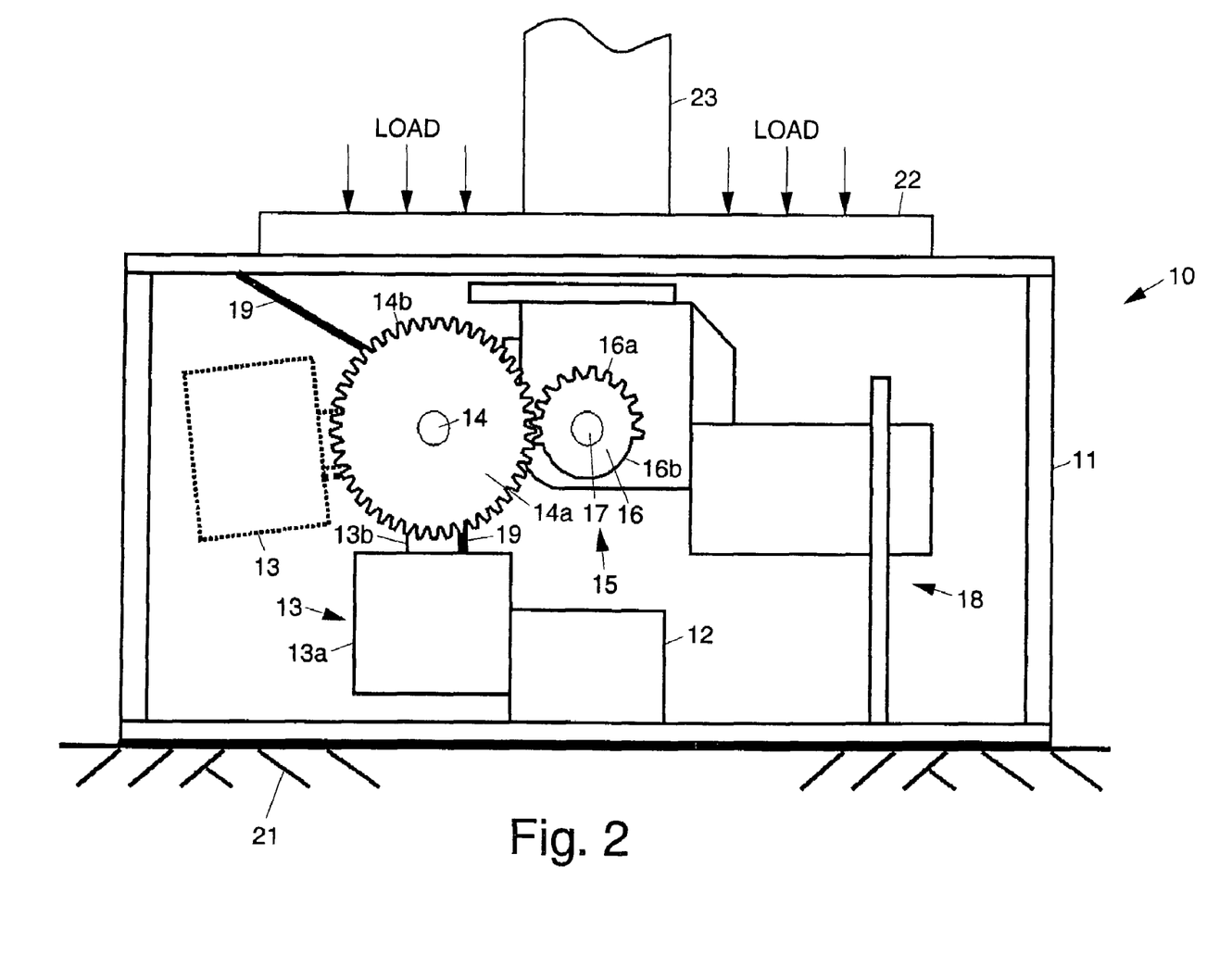
FIG. 2 is a first cross-sectional side view of the exemplary embodiment of a rotary actuated seismic shear wave generator.
Figure 3:
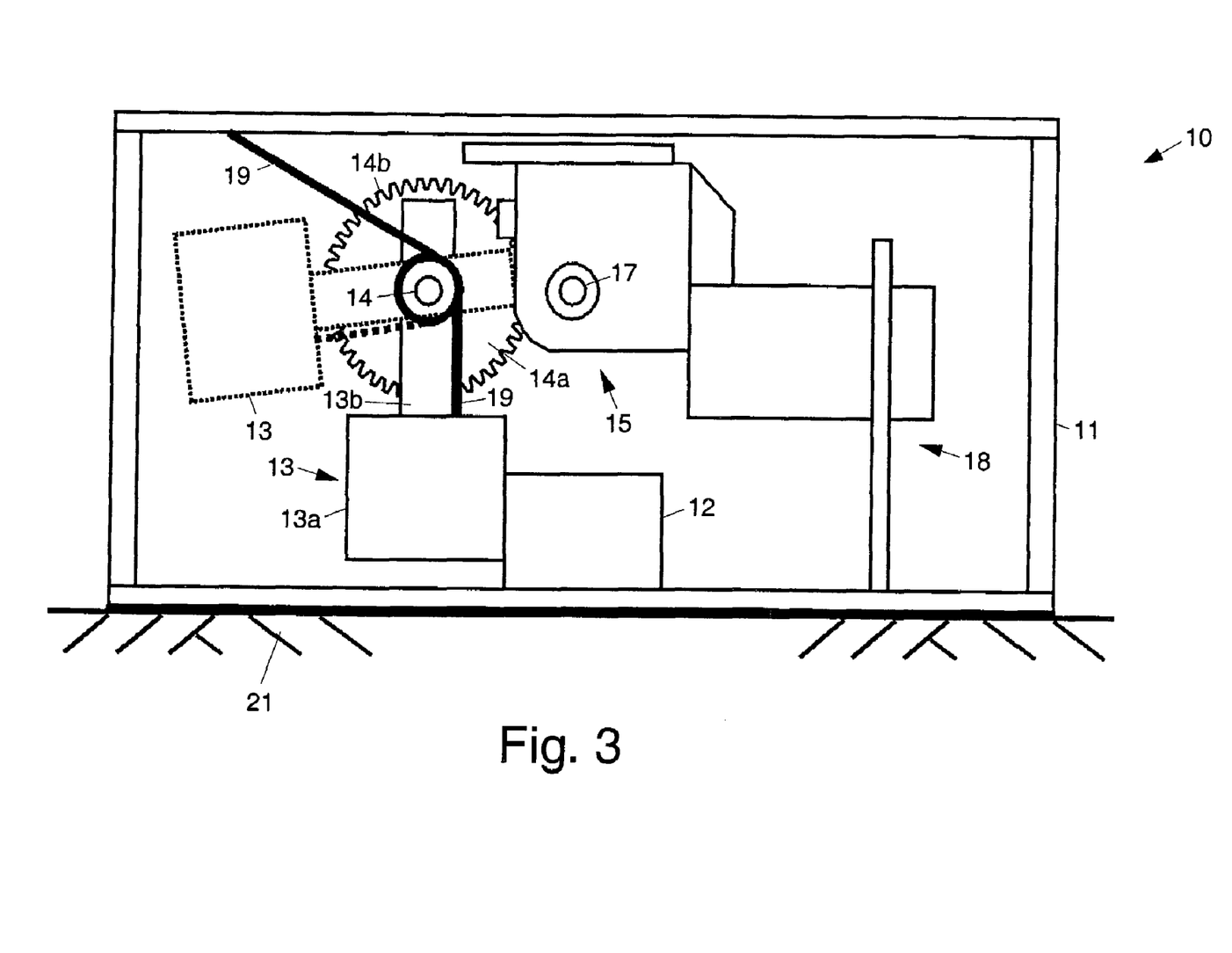
FIG. 3 is a second cross-sectional side view of the exemplary embodiment of a rotary actuated seismic shear wave generator.

Referring to the drawing figures, FIGS. 1-3 illustrate top and cross-sectional side views of an exemplary embodiment of a rotary actuated seismic shear wave generator 10 or source 10. The seismic source 10 generates seismic shear waves for use in down-hole shear wave velocity measurements in the ground 21 (soil or earth).

As is shown in FIGS. 1-3, the seismic generator 10 or source 10 comprises a spring-accelerated rotatable mass 13 (offset mass 13) that rotates in a plane perpendicular to the ground surface 21 (ground 21) and which transfers its energy to the ground surface 21 in a direction parallel to the surface 21 with an impact against an object 12 (striking plate 12 or impact member 12) coupled to the ground surface 21. As is shown in FIG. 2, the seismic generator 10 or source 10 is coupled to the ground 21 by exerting force on top of it (LOAD), such as by means of a plate 22 and shaft that couples the weight of a vehicle onto the top of the seismic generator 10. A horizontally polarized shear wave that propagates in the vertical direction is generated by the impact between the mass 13 and the striking plate 12 (object 12). Receivers 32 or sensors 32 (FIGS. 5 and 6) installed in the soil 21 below the seismic source 10 are used to sense the transmitted signal.

Figure 5:
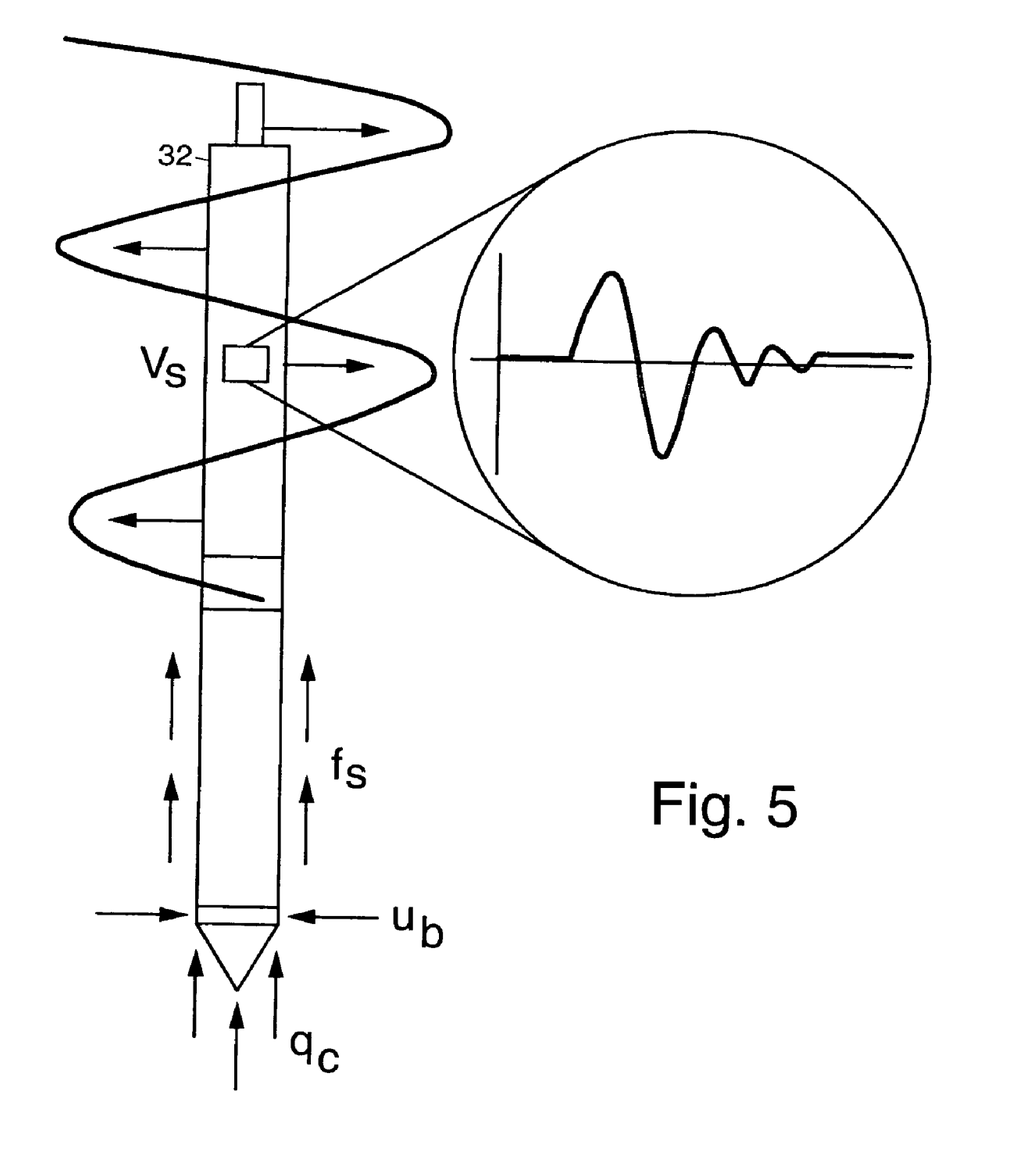
FIG. 5 illustrates an exemplary seismic cone penetrometer sensor for use with the exemplary rotary actuated seismic shear wave generator.

FIG. 5 illustrates an exemplary seismic cone penetrometer sensor 32 for use with the rotary actuated seismic shear wave generator 10. A cone penetrometer test is a direct-push method for evaluating several aspects of the subsoil, including strength, soil type, and pemeability, to name a few. The cone penetrometer device contains instrumentation to measure the penetration stress on the tip (qc), the frictional sliding resistance (fs), and the fluid pressures generated during penetration (ub). The seismic sensor has been integrated into a cone penetrometer, so that multiple, independent, tests can be performed simultaneously. The transmitted signals are recorded and analyzed to determine the velocity of the wave propagation. Devices or circuitry may be added to or coupled to the seismic source 10 to determine the time of impact relative to the times of the recorded signals.

More particularly, the source 10 comprises a housing 11 (beam 11) with having the spring-accelerated rotatable mass 13 (hammer 13) mounted inside. The hammer 13 comprises a shaft 13b with a steel mass 13a on one end and an axle 14 (hammer axle 14) through the other end. The hammer axle 14 passes through the housing 11 (beam 11) horizontal to the ground surface 21 and the hammer 13 mounts on the hammer axle 14 inside the housing 11. The hammer 13 may be configured to rotate only 90 degrees about the hammer axle 14 in a plane perpendicular to the ground 21.

A variable-speed DC gear-driven motor 15 is used to rotate the hammer 13. The motor 15 is mounted in the housing 11 by way of a support structure 18 (generally designated). The rotatable hammer 13 is caused to strike the striking plate 12 (such as a steel block or anvil) welded (secured) to the inside base of the housing 11 to generate the shear waves. The impact force is increased with the use of torsion springs 19 on the axle 16 which accelerate the hammer 13 towards the striking plate 12. The reaction forces of the springs 19 accelerating the mass 13 are directed against the housing 11 (in the vertical direction to minimize the reaction transmitted to the soil 21 in the shear direction.

Figure 4:
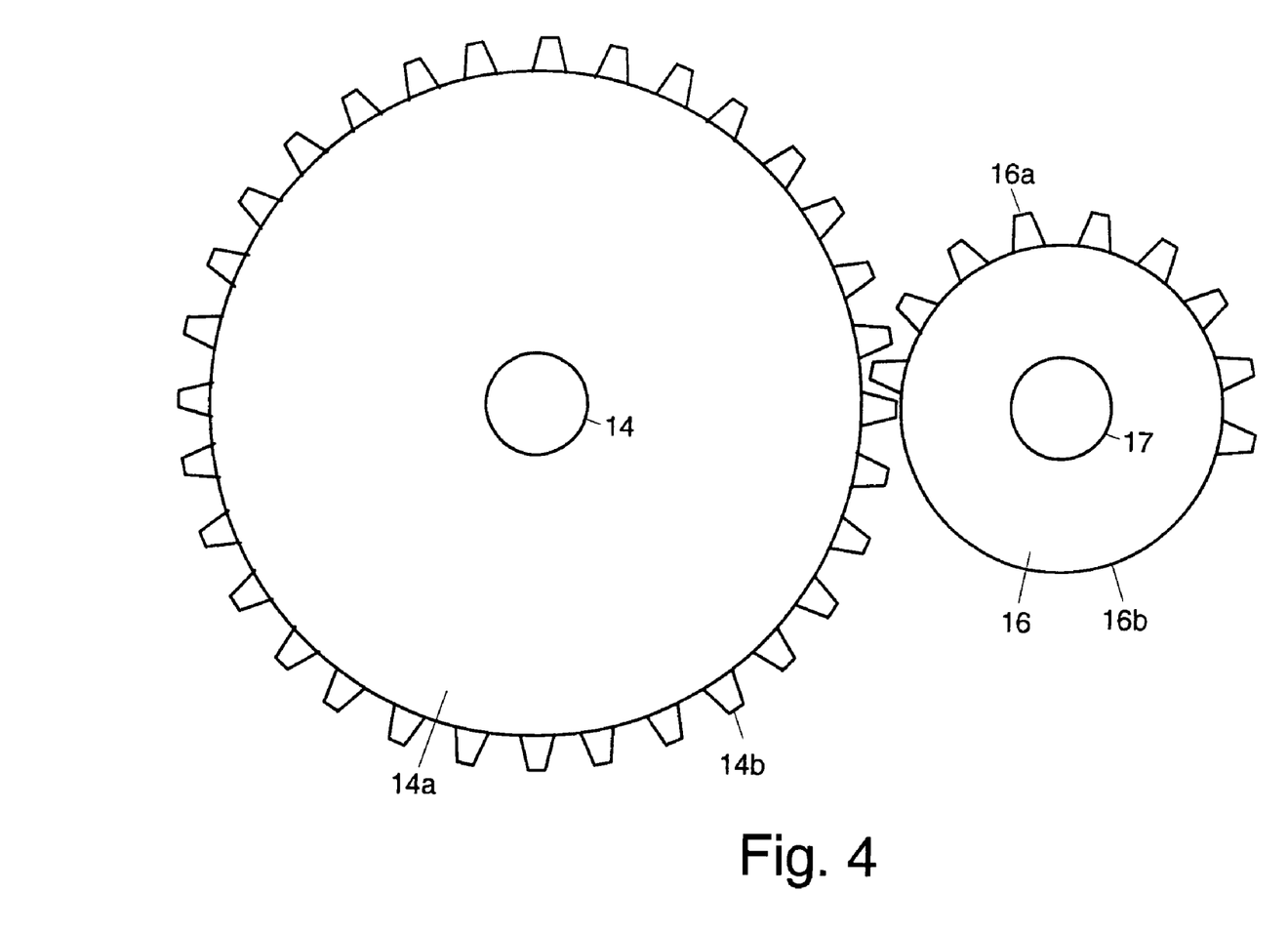
FIG. 4 is an enlarged view of a gear arrangement that may be employed in the exemplary rotary actuated seismic shear wave generator.

The axle 14 attached to the hammer 13 has a spur gear 14a with teeth 14b around its entire circumference, and which is driven by a second spur gear 16 (or motor axle gear 16) on a parallel motor axle 17. The motor axle gear 16 has teeth 16a around most of its circumference. Missing teeth 16b on the motor axle gear 16 allow the hammer 13 to wind up to 90 degrees and then slip, rotating down to hit the striking plate 12. The teeth 16a on the motor axle gear 16 pick the hammer 13 up the next time around, allowing the source 10 to activate repeatedly while running the motor 13 in one direction. FIG. 4 is an enlarged view of the exemplary gear arrangement used in the exemplary rotary actuated seismic shear wave generator 10 shown in FIGS. 1-3.

The depth of transmission may be increased by choosing springs 19 with higher stiffness and by increasing the mass of the hammer 13. A reduced to practice embodiment of the generator 10 or source 10 used a mass 13a less than 1 lb and was able to transmit a signal more than 15 meters (~50 feet) into the ground 21. Additionally, the generator 10 or source 10 may be made to work submerged, for offshore applications. The generator 10 or source 10 may also be used to generate other types of waves by changing the orientation of the housing 11, for example.

The seismic shear wave generator 10 or source 10 comprises a remotely operated device for generating horizontally polarized vertically propagating shear waves for use in down-hole shear wave velocity measurement systems. The seismic signals are generated by the offset mass 13 rotating in a plane perpendicular to the ground surface 21, which impacts the object 12 (striking plate 12) coupled to the ground surface 21 at the moment the motion of the mass 13 is tangent to the ground surface 21. The energy of impact is transmitted to the ground 21 parallel to the ground surface.

The seismic generator 10 or source 10 differs from most conventional sources because it uses a rotating motion instead of a horizontal motion. Another primary difference is the use of the spring-accelerated rotatable mass 13. Because the acceleration is not horizontal, the reaction forces caused by acceleration of the mass 13 create less horizontal shear stress in the ground 21 prior to the desired time (impact). In most existing devices, the reaction forces of the horizontally accelerated mass are transmitted to the soil, generating undesirable waves that obscure desirable waves caused by the impact.

The shear wave is generated by the hammer 13 striking the steel striking plate 12. The hammer 13 is supported on the axle 14 that is rotated by the use of a spur-gear arrangement 14, 16 or other device capable of rotating the hammer 13 through 90 degrees of motion. The gears 14, 16 are mounted on the motor shaft 17 and are driven by a remotely controlled variable-speed DC gear motor 15 or other suitable device. The gear motor 15 or device may be manually operated if necessary. The hammer 13 is coupled to the torsion springs 19 or other spring arrangement that accelerates the hammer 13 in a rotating manner causing it to strike an striking plate 12 with sufficient force to generate a repeatable shear wave that can be detected by a geophone sensor 32 implanted in the ground 21. The seismic shear wave generator 10 or source 10 is mounted in or on a beam or plate comprising the housing 11 that is coupled to the ground surface 21.

The most unique part of the device is the rotation of the hammer through 90 degrees to a position parallel with the ground surface where it is released. In this position, all reactions from the release of the hammer are in the vertical direction. This is important because it permits the release and generation of a shear wave without the reaction impulse of linear actuated devices.

A fundamental difference between the seismic shear wave generator 10 or source 10 and conventional seismic sources is that the rotational motion perpendicular to the ground surface 21. During the rotational acceleration, less reaction force is transmitted parallel to the ground surface 12 than by devices using horizontal acceleration. This allows the seismic shear wave generator 10 or source 10 to be functional and small at the same time. The reaction forces of the springs 19 accelerating the mass 13 are directed against the striking plate 12 in the vertical direction to minimize the reaction transmitted to the ground surface 21 in the shear direction.

Figure 6:
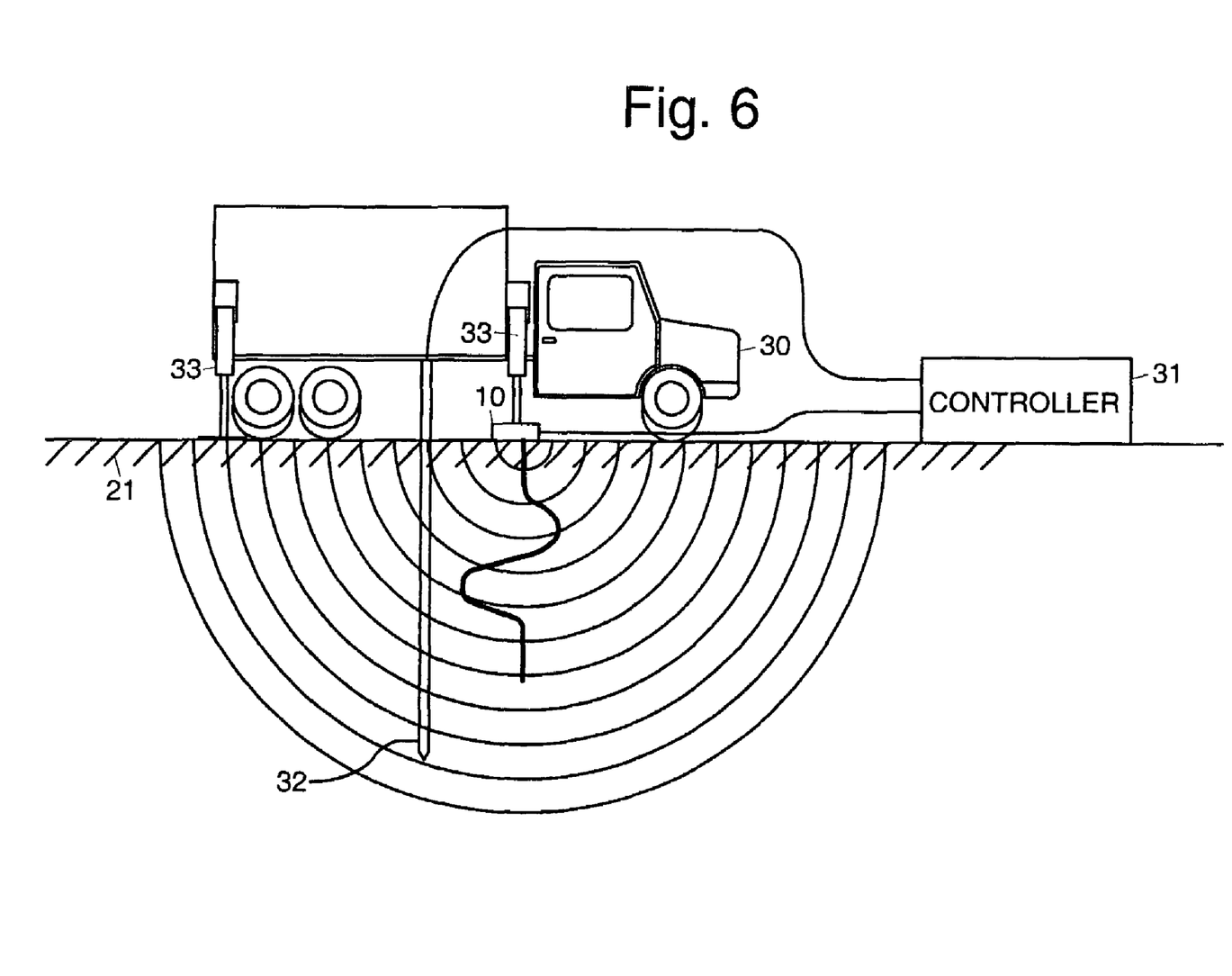
FIG. 6 illustrates operation of the exemplary rotary actuated seismic shear wave generator.

FIG. 6 illustrates operation of the exemplary rotary actuated seismic shear wave generator 10. As is illustrated in FIG. 6, a vehicle 30 is jacked up above the ground 21 so that it exerts force on top of the rotary actuated seismic shear wave generator 10. This couples the rotary actuated seismic shear wave generator 10 to the ground 21. The rotary actuated seismic shear wave generator 10 is coupled to a controller 31 that controls operation of the motor 15. The controller 31 is also coupled to one or more seismic sensors 32. An exemplary seismic sensor 32 is a geophone sensor 32. such as a model GS-14L3 sensor manufactured by Geo Space, LP, for example. The seismic sensors 32 may be encased in a steel rod of desired construction.

The sensor 32 is inserted into the ground 21 in a timed manner, typically on the order of 1-2 centimeters per minute. During the time that the sensor 32 is inserted into the ground 21, the rotary actuated seismic shear wave generator 10 is actuated to generate a sequence of seismic shear waves that are coupled into the ground 21. An exemplary seismic shear wave generator 10 having a hammer 13 that is on the order of 8 pounds is capable of generating seismic shear waves that penetrate on the order of 100 meters into the ground 21.

Figure 7A:
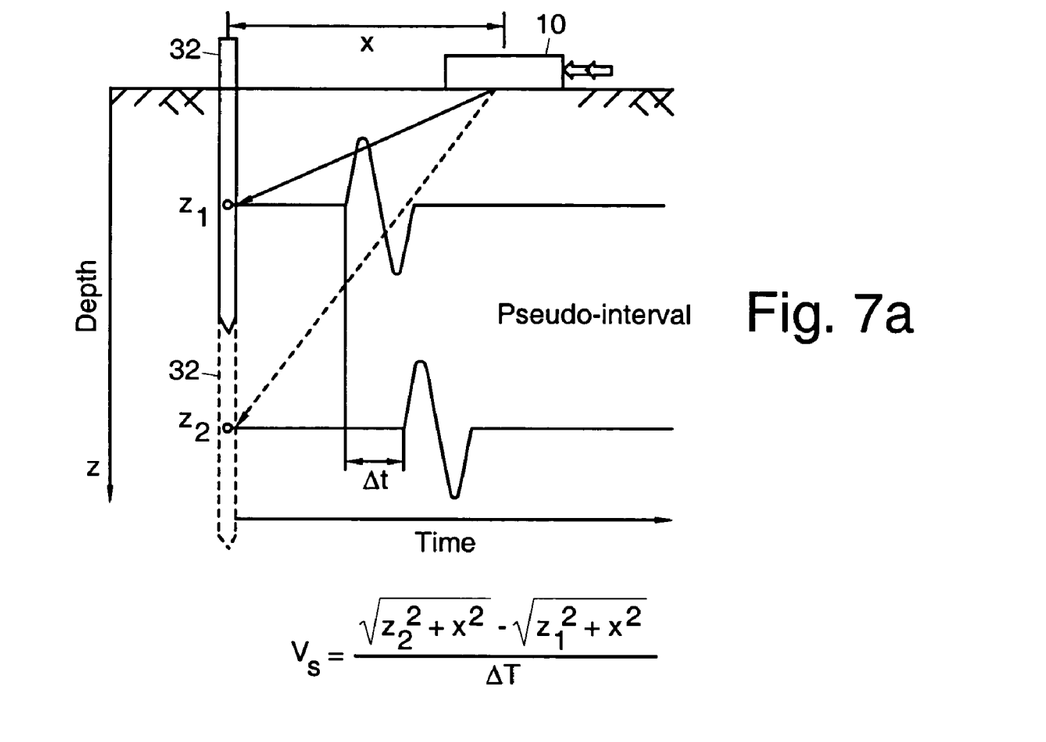
FIGS. 7a and 7b show pseudo-interval and true-interval test setups, respectively, using the exemplary rotary actuated seismic shear wave generator.
Figure 7B:
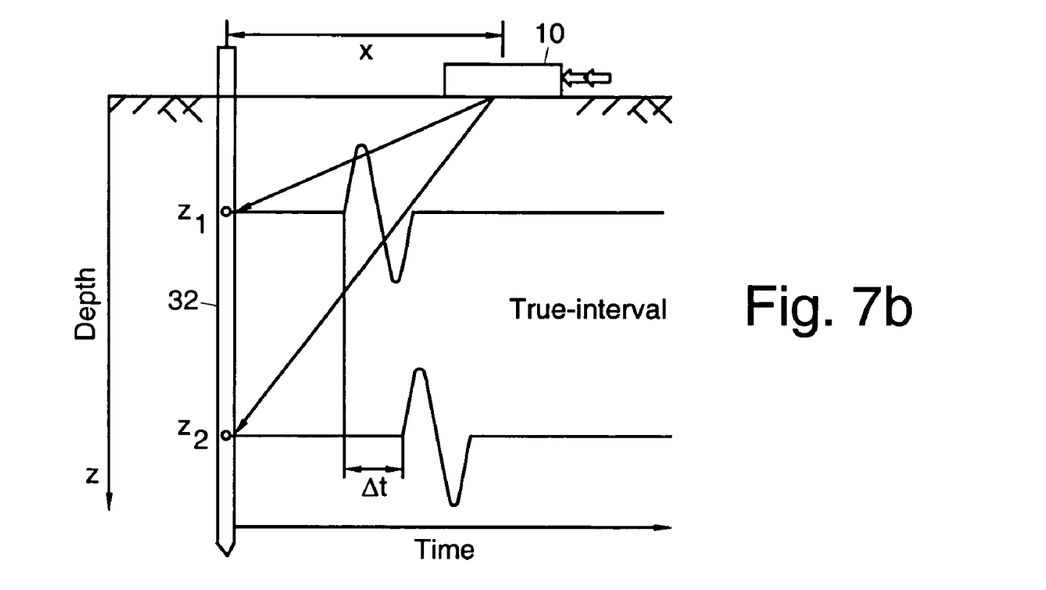

FIGS. 7a and 7b show pseudo-interval and true-interval test setups, respectively, using the exemplary rotary actuated seismic shear wave generator 10. The equation in the center of the drawing defines the calculation of the shear wave velocity (Vs) based on an assumed travel path for the waves. In actuality, velocity changes may cause curvature, or refraction, of the wave path, however this can be controlled by keeping the distance, X, to a minimum. The sensor 32 receives and monitors the transmitted seismic shear waves (using a variety of well-known sensors) and couples the detected signals to the controller 31 for processing. The detected signals are processed to produce the data shown in FIG. 9, for example, such as by using an HP1432A 16-channel Signal Analyzer recording at 40,000 samples per second, for example, in a manner well-known in the art.

Figure 8:
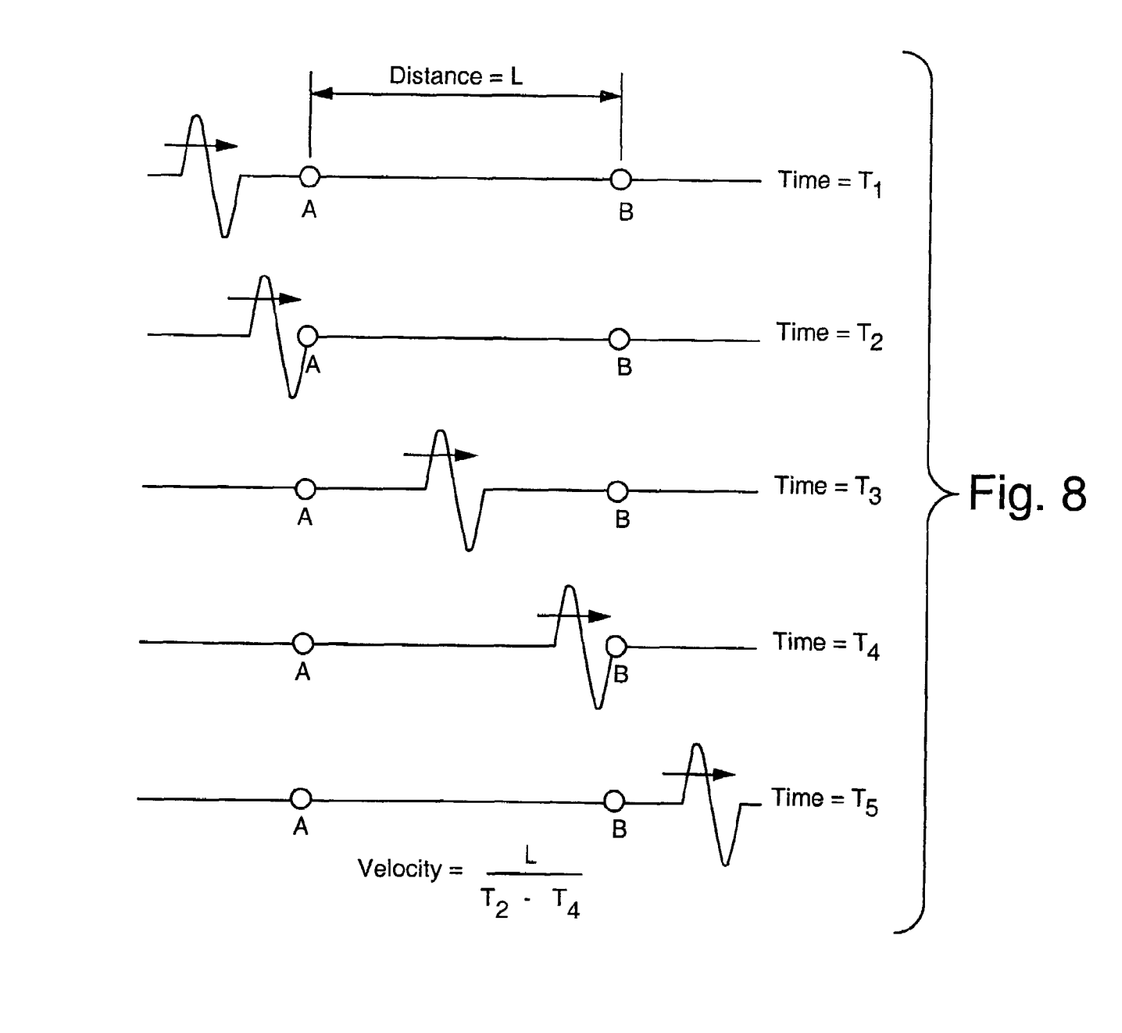
FIG. 8 illustrates the concept of measuring velocity over a specified interval, by showing how the time difference is determined as a wave passes between two points.
Figure 9:
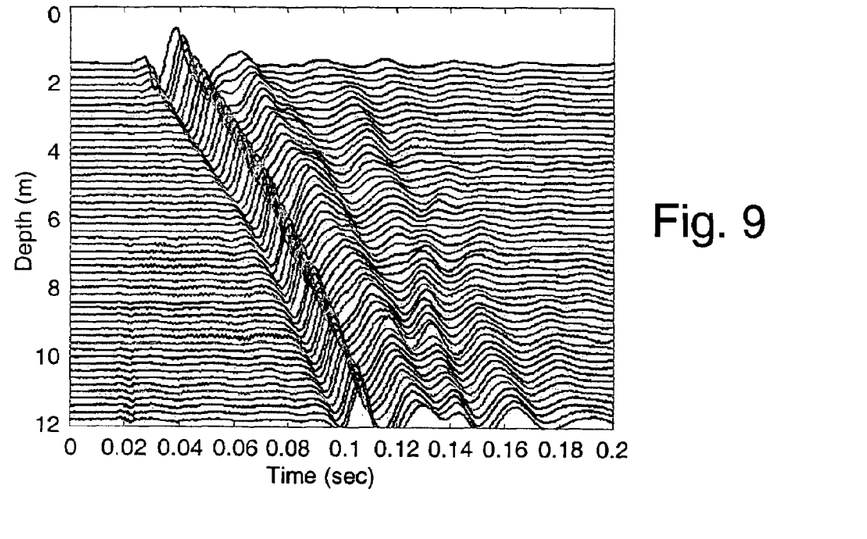
FIG. 9 is a graph showing data derived from testing of a reduced to practice embodiment of the rotary actuated seismic shear wave generator.

FIG. 8 illustrates travel time relating to a seismic shear wave moving past two sensors 32 and calculation of the velocity of the seismic shear wave. The seismic shear wave velocity is not something that can be measured at a point, so the travel time from point A to point B must be measured. A spacing between points A and B of approximately 1 meter is used to make time differences easier to see. Note that a single geophone (pseudo-interval) may be used, but the probe's position (depth) must be measured very accurately so the travel distance of the wave can be accurately known for each depth location. FIG. 9 is a graph showing data derived from testing of a reduced to practice embodiment of the rotary actuated seismic shear wave generator 10.

Figure 10:
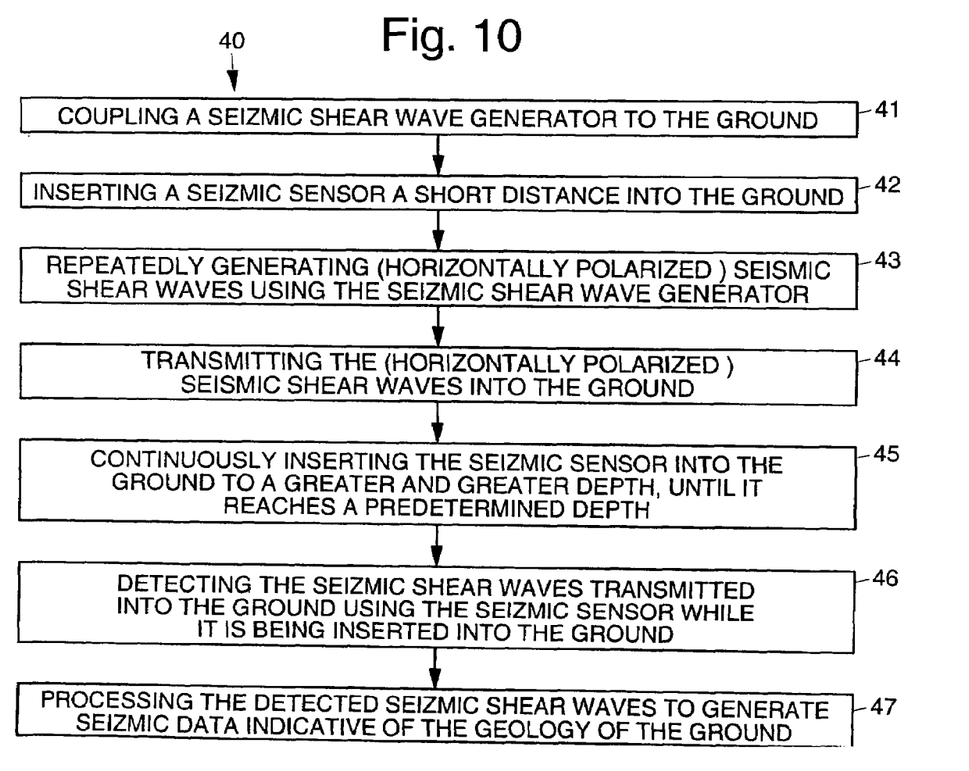
FIG. 10 is a flow diagram that illustrates an exemplary method employing the rotary actuated seismic shear wave generator.

FIG. 10 is a flow diagram that illustrates an exemplary method 40, which may employ the rotary actuated seismic shear wave generator 10 described above. The disclosed method 40 is operative to automatically perform seismic tests to a predetermined depth of the earth (ground 21). The exemplary method 40 involves the following actions.

A seismic shear wave generator 10 is coupled 41 to the ground 21. A seismic sensor 32 is inserted 42 a short distance into the ground 21. The seismic shear wave generator 10 is caused to repeatedly generate 43 seismic shear waves, and preferably horizontally polarized shear waves, which are transmitted 44 into the ground 21. Using the exemplary rotary actuated seismic shear wave generator 10, the motor 15 is operated to continuously, cause repeated impacts of the spring-accelerated rotatable mass 13 with a striking plate 12 that contacts the ground 21. To achieve this, the spring-accelerated rotatable mass 13 is rotated away from the impact member 12 to store energy, and is then allowed to accelerate with spring assistance to contact the impact member 12. The seismic sensor 32 is continuously inserted 45 into the ground 21 to a greater and greater depth while the seismic shear waves are transmitted 44 into the ground 21, until the sensor 32 reaches the predetermined depth. During insertion of the seismic sensor 32 into the ground 21, the seismic shear waves transmitted into the ground 21 are detected 46 by the seismic sensor 32. The detected seismic shear waves are processed 47 to generate seismic data indicative of the geology of the ground 21.

Thus, an improved rotary actuated seismic shear wave generator and method for generating seismic waves have been disclosed. It is to be understood that the above-described embodiment is merely illustrative of some of the many specific embodiments that represent applications of the principles discussed above. Clearly, numerous and other arrangements can be readily devised by those skilled in the art without departing from the scope of the invention.

What is claimed is:

1. Seismic apparatus, comprising:
    an impact member that is engageable with ground;
    a spring-accelerated rotatable mass disposed to contact the impact member;
    one or more springs coupled to the spring-accelerated rotatable mass for accelerating the rotatable mass into the impact member; and
    a gear-driven motor assembly coupled to the spring-accelerated rotatable mass for causing the rotatable mass to repeatedly impact the impact member;
    wherein a shear wave is generated when the rotatable mass contacts the impact member that is transmitted into the ground; and
    wherein the gear-driven motor assembly comprises:
        a first axle around which the rotatable mass rotates;
        a first gear coupled to the first axle;
        a motor having a motor axle; and
        a second gear, a portion of which has a smooth surface, coupled to the motor axle and that engages the first gear.

2. The apparatus recited in claim 1 which generates horizontally polarized shear waves that are transmitted into the ground.

3. The apparatus recited in claim 1 wherein the spring-accelerated rotatable mass is disposed to rotate in a plane perpendicular to the ground.

4. The apparatus recited in claim 1 wherein rotation of the second gear relative to the first gear causes rotation of the rotatable mass away from the impact member, which disengages the gears to allow the mass to rotate freely in the reverse direction towards the impact member when the smooth surface of the second gear is encountered by the first gear.

5. The apparatus recited in claim 1 wherein the mass is configured to rotate 90 degrees about the axle in a plane perpendicular to the ground.

6. The apparatus recited in claim 1 wherein the motor comprises a variable-speed motor.

* * * * *